3,148,170
POLYAMIDES CONTAINING THE ACETYLAMIDE OF ε-AMINOCAPROIC ACID AND A MANGANESE SALT OF SEBACIC OR ADIPIC ACID
Luigi Notarbartolo, Milan, and Luigi Ciceri, Como, Italy, assignors to SNIA Viscosa Società Nazionale Industria Applicazioni Viscosa S.p.A., Milan, Italy, a company of Italy
No Drawing. Filed Nov. 14, 1960, Ser. No. 68,620
Claims priority, application Italy, July 2, 1960, 643,339, 631,891
14 Claims. (Cl. 260—45.75)

It is known that polyamide yarns when exposed to the light undergo a substantial degradation, which is particularly pronounced when the yarn contains titanium dioxide as a delustering agent. The sensitivity of the yarn to the light increases with its titanium dioxide content and when said content is between 0.5 and 3% by weight, the degradation is rapid.

It has been proposed since some time to incorporate in the polymer manganese compounds to reduce the catalytic effect of titanium dioxide with respect to light induced degradation.

Generally, inorganic manganese salts, in particular phosphates, are used, as they are stable at the temperature at which the polymer is prepared and subsequently is melted and extruded.

It is further necessary to employ manganese compounds that do not significantly colour the polymer.

Organic manganese compounds have not been used so far as they are very sensitive to the temperature at which the polymerization is carried out and are further sensitive to the presence of acetic acid or other acids generally used as stabilizers, that is to limit the length of the polymer chains. Thus, for instance, it has been suggested to employ as a manganese salt, the oxalate. This salt by itself is stable at the polymerization temperature; however, it reacts with acetic acid in the presence of water and is transformed into manganese acetate, which under heating and in the presence of water, becomes brown and colours the polymer.

It is an object of the present invention to provide polyamides, having improved stability to the light.

It is another object of this invention to provide a method for improving the stability of polyamides towards exposure to the light. In a particular embodiment of the invention, the polyamide is the polymer of caprolactam.

Other objects and characteristics of the invention will appear as the description proceeds.

The present invention is characterized in that the polyamide forming monomer is polymerized in the presence of a dibasic manganese salt of a dicarboxylic organic acid, such as adipic or sebacic acid and of a polymer chain stabilizer chosen among dicarboxylic organic acids, the same acid from which the aforementioned manganese salt is formed and being preferably chosen, and the acetylamide of ε-aminocaproic acid (having the formula $CH_3CONH—(CH_2)_5COOH$). The polymer thus obtained, when delustered with titanium dioxide in an amount varying from 0.2 to 3%, is stable to the light.

The dibasic manganese salt of adipic or sebacic acid is obtained preferably by reacting the dibasic acid in a boiling aqueous solution with a corresponding stoichiometric quantity of manganese carbonate until the $CO_2$ is completely eliminated.

It is not necessary to separate the manganese salt thus formed; the solutions obtained in this manner are preferably directly employed; but the corresponding crystallized salts could be employed.

The solutions of dibasic manganese salts of dicarboxylic acids thus obtained are added to the monomer or monomer solutions, containing 0.2-3% of $TiO_2$ as a delustering agent, in quantities corresponding to a percentage, calculated as manganese, which varies from 0.001 to 0.01, and preferably from 0.004 to 0.006% by weight of the monomer.

The acetylamide of aminocaproic acid, when used is prepared from ε-aminocaproic acid and acetic anhydride, reacted together in the cold in a molar ratio of 1 to 2.

At the end of the reaction, which is exothermic, the solution is diluted with water and the excess water and the acetic acid formed are distilled under a vacuum. The acetyl derivative is purified by crystallization from boiling water. It is a white cristalline solid, very slightly soluble in cold water with a melting point of 105–108° C.

The acetylamide or the dicarboxylic acid used as polymer chain stabilizers can be added to the monomers separately from the dibasic manganese salts. The amount of chain stabilizer can be calculated stoichiometrically as it is related in a manner well known to those skilled in the art, to the degree of polymerization of the polymer finally obtained and therefore to its viscosity. The dicarboxylic acids are reckoned in such stoichiometrical calculations, as monofunctional reagents. If any losses of stabilizer are foreseen a corresponding excess is introduced. In practice, the amounts used vary preferably from 1 mol of stabilizer to 80 mols of monomer to 1 mol of stabilizer per 320 mols of monomer.

When the dicarboxylic acid from which the manganese salt employed is derived, is used as a polymer chain stabilizer, it may be expedient to prepare a solution of said dicarboxylic acid containing the necessary quantity for the stabilization of the polymer chains and an excess proportional to the anionic quantity necessary to obtain the manganese salt required for the stabilization of the polymer against light, to add and react in the hot manganese carbonate in the amount necessary to react with said excess, and to use the solution obtained as a chain-stabilizing and light-stabilizing means.

The polymerization is carried out under the usual conditions well known for each individual monomer to all those skilled in the art. Broadly, said conditions for continuous or batch operations, as the case may be, are as follows:

When the monomer is caprolactam, by heating in the presence, at least initially, of at least 0.1% by weight of water with respect to the monomer, at temperatures of 180°–350° C., and preferably 240°–300° C., until the desired viscosity is reached (usually for 6–36 hours), the use of a pressure of 1–20 atm. being optional but the pressure being in any case discharged and, if desired but not necessarily, a reduced pressure being employed, towards the end of the reaction;

When the monomer is the adipate of hexamethylenediammonium or metaxylylenediammonium, by heating initially in the presence of enough water to render the reaction mass fluid, in a closed vessel (preferably 30–60% by weight of the monomer), at temperatures of at least 180° C. and preferably 180–240° C. and preferably at pressures of 2–20 atm., preferably until a substantial equilibrium has been reached by formation of a relatively low molecular weight polymer, and subsequently discharging the pressure built up in the closed vessel and continuing heating at temperatures of 240–350° C. and preferably 260–290° C., optionally under an inert gas stream or reduced pressure, until the desired viscosity has been reached, usually for 1–10 hours;

When the monomer is 11-aminoundecanoic acid, by heating a mixture of monomer and water, the latter being 10–300% and preferably 20–60% by weight of the monomer, in a closed vessel and temperatures of 150–230° C. and preferably at a pressure of 3–15 atm., preferably until a substantial equilibrium has been reached by formation of a relatively low molecular weight polymer, and subsequently discharging the pressure and continuing heating at temperatures of 190–320° C. and preferably 230–280° C., optionally under an inert gas stream or reduced pressure, until the desired viscosity has been reached, usually for 2–15 hours; or by forming a solution or suspension of the monomer in water, atomizing the same, quickly evaporating the water thereof by contact with surfaces heated to at least 180° C., causing the formation of a relatively low molecular weight polymer, and then completing the condensation as hereinbefore set forth.

In all cases white polymer are obtained which yield light stable yarns even when the contents of delustering $TiO_2$ are high (2–3%).

The invention will be better understood with the aid of the description of the following non limitative embodiments.

Example 1

In a 20 l. autoclave there are introduced 10 kg. of caprolactam containing 45 g. of titanium dioxide type Anatase, 500 g. of water, 45.5 g. of acetylamide of aminocaproic acid and 50 cc. of an aqueous solution containing 1.80 g. of dibasic manganese adipate, obtained by reacting until complete evolution of $CO_2$, an aqueous solution of 1.33 g. of adipic acid with 1.05 g. of freshly prepared manganese carbonate. The autoclave is brought in 2 hours to a temperature of 260° C. while progressively eliminating the water vapour and is maintained at said temperature and atmospheric pressure under stirring for 14 hours.

At this point, the autoclave is brought in 2 hours by the progressive application of a vacuum, to a residual pressure of 260 mm. Hg. Finally, the polymer formed is extruded by inert gas pressure, and is cooled down and cut into regular chips. The polymer obtained appears perfectly white and has a relative viscosity in sulphuric acid (concentration 1%) of 2.63. After washing and drying the polymer is spun in a spinning head provided with a melting grid in the counts 15 deniers monofilament and 30 deniers 6 filaments.

The stability to the light is determined by calculating the drop in tenacity found, on ribbons washed and set, prepared from the yarn to be tested, after exposure to the light in a Fade-Ometer apparatus of the Atlas Electric Devices Co., Chicago, under the conditions set forth in ASTM Standards on Textile Materials, D. 506–50–T, ed. 1951, pages 174 and following.

The improved stability to the light of the yarn obtained from this polymer is easily evidenced. After 100 hours of exposure in the Fade-Ometer, the average tenacity drop, in percentage, is 3% for the 15/1 count and 4% for the 30/6 count; whereas yarns from a polymer, obtained under the same conditions described, but without the addition of manganese adipate, show after 100 hours of exposure a mean tenacity drop of 43% for the 15/1 count and 57% for the 30/6 count.

Example 2

The operations described in Example 1 are repeated but the delustering agent employed consists in 200 g. (2% by weight of the monomer) of titanium dioxide type Anatase.

The polymer appears perfectly white and has a relative viscosity in sulphuric acid solution of 2.81.

The mean percentage tenacity drop of the yarns obtained with this polymer after 100 hours of exposure in the Fade-Ometer under the conditions described in Example 1, is 6% for the 15/1 count and 8% for the 40/10 count, against a mean drop of 41% for the 15/1 count and 70% for the 40/10 count found in the yarns from a polymer obtained under the same conditions but without the additions of dibasic manganese adipate.

Example 3

The operations described in Example 1 are repeated, but the delustering agent employed consists in 45 g. of titanium dioxide type Anatase LF. This type of $TiO_2$ is a product of the British Titan Products particularly treated to improve its resistance to the light. The polymer obtained appears perfectly white and has a relative viscosity in sulphuric acid solution of 2.68. The mean percentage tenacity drop of the yarns obtained with this polymer, after 100 hours of exposure in the Fade-Ometer under the conditions described in Example 1, is 1.5% for the 15/1 count and 2.5% for the 30/6 count, against a mean drop of 29% for the 15/1 count and 42% for the 30/6 count found in the yarns from a polymer obtained under the same conditions but without the addition of dibasic manganese adipate.

Example 4

The operations of Example 1 are repeated, but the delustering agent employed consists in 45 g. of titanium dioxide type Unitane 0–310. This type of titanium dioxide is a product of the American Cynanamid Corp. particularly treated to improve its resistance to the light. The polymer obtained appears perfectly white and has a relative viscosity in sulphuric acid solution of 2.71.

The mean percentage tenacity drop of the yarns obtained from this polymer after 100 hours of exposure in the Fade-Ometer under the conditions described in Example 1, is 2% for the 15/1 count and 3% for the 30/6 count, against a mean drop of 25% for the 15/1 count and 38% for the 30/6 count found in the yarns from a polymer obtained under the same conditions but without the addition of dibasic manganese adipate.

Example 5

The operations of Example 1 are repeated, but the stabilizer to the light employed consists in 150 cc. of a boiling aqueous solution containing 2.29 g. calculated as dibasic manganese sebacate, obtained by reacting, until complete evolution of $CO_2$, a solution of 2.02 g. of sebacic acid with 1.05 g. of freshly prepared manganese carbonate.

The polymer obtained appears perfectly white and has a relative viscosity in sulphuric acid solution of 2.65.

The mean percentages tenacity drop of the yarns obtained from this polymer after 100 hours of exposure in the Fade-Ometer under the conditions described in Example 1, is 2% for the 15/1 count and 6% for the 30/6 count which is already considerably more favourable than the behaviour of the yarns obtained without the addition of dibasic manganese sebacate (see Example 1).

Example 6

In a 20 l. autoclave there are introduced 7 kg. of hexamethylene diammonium adipate containing 0.45% by weight of titanium dioxide type Anatase, 63 g. of acetylamide of aminocaproic acid, 3.050 kg. of distilled water and 35 cc. of an aqueous solution containing 1.26 g. calculated as dibasic manganese adipate and prepared as described in Example 1.

The autoclave is brought to 110° C. and 50% of the water introduced is eliminated by distillation; thereafter the temperature is raised in 1 hour to 180° C. and a pressure of 5 atm. is reached. The temperature is then continuously raised while maintaining the pressure at 5 atm. by the discharge of gases, up to 250° C. The pressure is decreased progressively during 1 hour to atmospheric pressure and the mass is brought to 275° C. and maintained under stirring for 2 hours. At this point the autoclave is progressively brought in 4 hours by the application of vacuum to a residual pressure of a few millimeters of Hg and maintained at such a pressure for a further half hour. Finally the pressure is re-established by means of an inert gas and the polymer is extruded, cooled down and out into regular chips.

The polymer thus obtained is perfectly white and has an intrinsic viscosity in metacresol solution of 1.05.

The mean tenacity drop of the yarns obtained from this polymer after 100 hours of exposure in the Fade-Ometer under the conditions described in Example 1, is 3/5% for the 15/1 count and 5% for the 30/6 count, against a mean drop of 32% for the 15/1 count and 48% for the 30/6 count found in yarns from a polymer obtained under the same conditions but without the addition of dibasic manganese adipate.

*Example 7*

The operations of Example 6 are repeated but the monomer employed consists in 7 kg. of metaxylylenediammonium adipate. The polymerization is carried out according to the cycle described in Example 6 for hexamethylene diammonium adipate.

The polymer obtained appears perfectly white and has an intrinsic viscosity in a metacresol solution of 0.94.

The mean tenacity drop in the yarns obtained from this polymer after 100 hours of exposure in the Fade-Ometer under the conditions described in Example 1, is 5.5% for the 15/1 count and 7% for the 30/6 count; against a mean drop of 52% for the 15/1 count and 58 for the 30/6 count found in yarns from a polymer obtained under the same conditions but without the addition of dibasic manganese adipate.

*Example 8*

The operations of Example 5 are repeated, but the monomer employed consists in 10 kg. of aminoundecanoic acid containing 0.5% of titanium dioxide type Anatase, 79 g. of acetylamide of aminocaproic acid, 3.200 kg. of distilled water and 150 cc. of a boiling aqueous solution containing 2.29 g. calculated as dibasic manganese sebacate and obtained as described in Example 5. The autoclave is brought to 180° C and 8 atm. of pressure in about 2 hours. The temperature is then further raised up to 275° C. while the pressure is maintained at 8 atm. by discharge of the gases. Thereafter the pressure is progressively lowered in 2 hours to atmospheric pressure while the mass is brought to the temperature of 260° C. and subsequently maintained under stirring for 4 hours under these conditions. At this point a light stream of inert gas is passed during a half hour and finally the polymer formed is extruded, cooled down and cut into regular chips. The polymer obtained appears perfectly white and has an intrinsic viscosity in metacresol solution of 0.98.

The mean tenacity drop of the yarns obtained from this polymer after exposure of 100 hours in Fade-Ometer under the conditions described in Example 1, is 4% for the 15/1 count and 5% for the 30/6 count; against a mean drop of 33% for the 15/1 count and 42% for the 30/6 count found in yarns from a polymer obtained under the same conditions but without the addition of dibasic manganese sebacate.

*Example 9*

Into a 20 litres autoclave, there are introduced 13 kg. of caprolactam, 600 g. of water, 58.5 of titanium dioxide type Anatase, 39.6 g. of sebacic acid and 200 ml. of a boiling aqueous solution obtained by reacting, till complete evolution of $CO_2$, 2.63 g. of sebacic acid with 1.36 g. of freshly prepared manganese carbonate. The autoclave is brought in the course of 2 hours, by progressively venting the steam, to a temperature of 260° C., and is kept at that temperature and at atmospheric pressure for 14 hours under stirring. At that time the autoclave is brought in 2 hours by progressive application of vacuum to a residual pressure of 240 mm. Hg. Finally the polymer formed is extruded by gas pressure, then cooled down and cut into regular chips.

The polymer obtained appears perfectly white and has a relative viscosity in sulfuric acid (concentration 1%) of 2.65.

After washing and drying, the polymer is spun in a spinning head provided with a melting grid, in the counts 15 den. monofilament and 30 den.-6 filaments.

The stability to the light is determined by calculating the drop in tenacity found on ribbons washed and set, prepared from the yarn to be tested after exposure to the light in a Fade-Ometer apparatus of the Atlas Electric Devices Co., Chicago, under the conditions set by the ASTM Standards on Textile Materials, D.506–50T, edition 1951, pages 174 and following.

The improved stability to the light of the yarns obtained from this polymer is easily evidenced.

After 100 hours of exposure in the Fade-Ometer the average tenacity drop, in percentage, is 3% for the 15/1 count and 5% for the 30/6 count; whereas yarns from a polymer, obtained under the same conditions described, but without the addition of the manganese salt of sebacic acid, show after 100 hours of exposure a mean tenacity drop of 43% for the 15/1 count and 57% for the 30/6 count.

*Example 10*

The operations of Example 9 are repeated, but with 260 g. (2% by weight of the monomer) of Anatase type titanium dioxide.

The polymer obtained appears perfectly white and has a relative viscosity of 2.85 in sulfuric acid solution.

The average percent tenacity drop in the yarns obtained from this polymer after 100 hours' exposure in the Fade-Ometer, under the conditions described in Example 1, is 5% for the 15/1 count and 11% for the 40/10 count, against an average of 41% for the 15/1 count and 70% for the 40/10 count found in yarns from a polymer obtained under the same conditions but without any addition of manganese salt of sebacic acid.

*Example 11*

The operations of Example 9 are repeated, but using 58.5 g. of Anatase LF Type $TiO_2$ as an opacizing agent. This $TiO_2$ type is a product of the British Titan Products treated particularly to improve its resistance to the light.

The polymer obtained appears perfectly white and has a relative viscosity of 2.72 in sulfuric acid solution.

The average percent tenacity drop in the yarns obtained from this polymer, after 100 hours' exposure in the Fade-Ometer under the conditions described in Example 1, is 2.5% for the 15/1 count and 4% for the 30/6 count against an average decrease of 29% for the 15/1 count and of 42% for the 30/6 count found in yarns from a polymer obtained under same conditions but without any addition of manganese salt of sebacic acid.

*Example 12*

The operations of Example 9 are repeated, but using as a delustering agent 58.5 g. of Unitane 0–310 type titanium dioxide. This type of titanium compound is a product of the American Cyanamid Corp., treated particularly to improve its resistance to the light.

The polymer obtained appears perfectly white and has a relative viscosity of 2.60 in sulfuric acid solution.

The average percent tenacity drop yarns obtained from this polymer after 100 hours' exposure in the Fade-Ometer under the conditions described in Example 1, is 1.5% for the 15/1 count and 3% for the 30/6 count against an average decrease of 25% for the 15/1 count and 38% for the 30/6 count found in yarns from a polymer obtained under the same conditions but without addition of manganese salt of sebacic acid.

*Example 13*

Into a 20 litres autoclave there are introduced 8 kg. of hexamethylene diammonium adipate containing 0.45% by weight of titanium dioxide type Anatase, 3 kg. of distilled water and 500 ml. of a boiling aqueous solution obtained by reacting till complete evolution of the $CO_2$, an aqueous solution of 59.4 of adipic acid with 0.83 g. of freshly prepared manganese carbonate.

The polymerization is conducted in the following manner: 50% of the water introduced is eliminated by distillation, then the temperature is raised to 180° C. in 1 hour and the pressure to 5 atm. While keeping that pressure, the temperature is raised further up to 250° C.

During 1 hour the pressure is decreased progressively down to atmospheric and the mass is brought to 275° C. and kept at that temperature while stirring for 2 hours. At that time, by applying vacuum, the autoclave is brought progressively in 1 hour's time to a residual pressure of few mm. Hg and is kept at that pressure for a further half hour. Finally the pressure is raised again with an inert gas and the polymer formed is extruded, cooled down and cut into regular chips.

The polymer obtained is prefectly white and has a viscosity (intrinsic) in metacresol solution, of 1.09.

The average tenacity decrease of the yarns obtained from this polymer after 100 hours' exposure in the Fade-Ometer under the conditions described in Example 1, is 3.5% for the 15/1 count and 6% for the 30/6 count; against an average decrease of 32% for the 15/1 count and of 48% for the 30/6 count found in yarns from a polymer obtained under the same conditions, but without adding any manganese salt of adipic acid.

*Example 14*

The operations of Example 6 are repeated, but employing as a monomer 8 kg. of metaxylylene diammonium adipate.

The polymerization is conducted according to the cycle described in Example 5 for the adipate of hexamethylene diammonium.

The polymer obtained appears perfectly white and has an instrinsic viscosity of 0.94 in metacresol solution.

The average tenacity decrease of the yarns obtained from this polymer after 100 hours' exposure in the Fade-Ometer, under the conditions described in Example 1, is 5% for the 15/1 count and 12% for the 30/6 count; against an average decrease of 52% for the 15/1 count and of 58% for the 30/6 count found in yarns from a polymer obtained under the same conditions but without any addition of the manganese salt of adipic acid.

*Example 15*

The operations of Example 1 are repeated, but employing as a monomer 13 kg. of 11-amino undecanoic acid containing 0.45% by weight of titanium dioxide type Anatase, 3.900 kg. of distilled water, 70.5 g. of sebacic acid and 200 ml. of a boiling aqueous solution obtained by reacting 2.63 g. of sebacic acid with 1.36 g. of freshly prepared manganese carbonate.

The autoclave is brought up to 180° C. and to 8 atm. of pressure in about 2 hours. Then the temperature is raised further up to 225° C. keeping pressure at 8 atm. by degassing.

Then the pressure is decreased progressively in 2 hours down to atmospheric while bringing the mass to a temperature of 260° C. and then keeping it under those conditions while stirring, for 4 hours.

At that time, a slight stream of inert gas is passed during a half hour and finally the polymer formed is extruded, cooled down and cut to regular chips.

The polymer obtained appears perfectly white and has an intrinsic viscosity of 1.03 in metacresol solution.

The average tenacity decrease of the yarns obtained from this polymer, after 100 hours' exposure in the Fade-Ometer under the conditions described in Example 1, is 2% for the 15/1 count and 8% for the 30/6 count; against an average decrease of 33% for the 15/1 count and of 42% for the 30/6 count found in yarns from a polymer obtained under the same conditions but without any addition of manganese salt of sebacic acid.

We claim:

1. A process for preparing a light stable fiber-forming linear polyamide, comprising the steps of carrying out the polymerization of linear polyamide forming monomers in the presence of a dibasic manganese salt of a dicarboxylic organic acid selected from the group consisting of adipic and sebacic acid, and of a polymer chain stabilizer selected from the group consisting of adipic acid, sebacic acid and the acetylamide of $\epsilon$-aminocaproic acid, said polymer chain stabilizer being employed in quantities comprised between 1 mol per 80 and 1 mol per 320 mols of monomers.

2. A process according to claim 1, comprising preparing the dibasic manganese salt by reacting the corresponding dicarboxylic acid in a boiling aqueous solution with the corresponding stoichiometric quantity of manganese carbonate until complete elimination of carbon dioxide and adding the solution thus obtained directly to the polyamide forming monomers.

3. A process according to claim 1, wherein the dibasic manganese salt is employed in quantities, calculated as manganese, comprised between 0.004 and 0.006% by weight of the monomers.

4. A process according to claim 1, comprising preparing a solution of a dicarboxylic acid containing the quantity of acid necessary for the stabilization of the polymer chains and an excess of acid proportional to the anionic quantity necessary to obtain the manganese salt required for the stabilization of the polymer against light, adding manganese carbonate in the quantity necessary to react with said excess, and adding the solution thus obtained, as a chain and light stabilizing means, to the monomers.

5. A process according to claim 1, wherein the monomer is caprolactam.

6. A light-stable polyamide, prepared by the process of claim 1.

7. A process for preparing a light stable fiber forming linear polyamide, comprising the steps of carrying out the polymerization of linear polyamide forming monomers in the presence of a dibasic manganese salt of a dicarboxylic organic acid selected from the group consisting of adipic and sebacic acid, the said manganese salt being employed in quantities, calculated as manganese, comprised between 0.001 percent and 0.01 percent by weight of the monomers, and of a polymer chain stabilizer selected from the group consisting of adipic acid, of sebacic acid and of the acetylamide of $\epsilon$-aminocaproic acid, the said polymer chain stabilizer being employed in quantities comprised between 1 mol per 80 mols and 1 mol per 320 mols of monomer.

8. A process for preparing a light stable fiber forming linear polyamide, comprising the steps of carrying out the polymerization of linear polyamide forming monomers in the presence of a dibasic manganese salt of a dicarboxylic organic acid selected from the group consisting of adipic and sebacic acid, and of a polymer chain stabilizer consisting of the acetylamide of $\epsilon$-aminocaproic acid, said polymer chain stabilizer being employed in quantities comprised between 1 mol per 80 mols and 1 mol per 320 mols of monomers.

9. A process for preparing a light stable fiber forming linear polyamide, comprising the steps of carrying out the polymerization of linear polyamide forming monomers in the presence of the dibasic manganese salt of sebacic acid and of a polymer chain stabilizer consisting of sebacic acid, said polymer chain stabilizer being employed in quantities comprised between 1 mol per 80 mols and 1 mol per 320 mols of monomers.

10. A process for preparing a light stable fiber forming linear polyamide, comprising the steps of carrying out the polymerization of linear polyamide forming monomers in the presence of the dibasic manganese salt of adipic acid and of a polymer chain stabilizer consisting of adipic acid, said polymer chain stabilizer being employed in quantities comprised between 1 mol per 80 mols and 1 mol per 320 mols of monomers.

11. A process for preparing a light stable fiber forming linear polyamide, comprising the steps of carrying out the polymerization of a monomer selected from the group consisting of caprolactam, hexamethylene diammonium adipate, metaxylylene diammonium adipate and aminoundecanoic acid in the presence of a dibasic manganese salt of a dicarboxylic organic acid selected from the group consisting of adipic and sebacic acid, the said manganese salt being employed in quantities, calculated as manganese, comprised between 0.004 and 0.006 percent by weight of the monomers, and of a polymer chain stabilizer consisting of the acetylamide of ε-aminocaproic acid, said polymer chain stabilizer being employed in quantities comprised between 1 mol per 80 mols and 1 mol per 320 mols of monomers.

12. A process for the preparation of light stable, color free polyamide yarns, comprising the steps of carrying out the polymerization of linear polyamide forming monomers in the presence of a dibasic manganese salt of a dicarboxylic organic acid selected from the group consisting of adipic and sebacic acid and of a polymer chain stabilizer selected from the group consisting of the said dicarboxylic organic acids and of acetylamide of ε-aminocaproic acid, and of producing light stable yarns from such processed polyamide.

13. A process for the preparation of light stable color free polyamide yarns, comprising the steps of carrying out the polymerization of linear polyamide forming monomers in the presence of a dibasic manganese salt of an acid selected from the group consisting of adipic and sebacic acid and of a polymer chain stabilizer consisting of the acetylamide of ε-amino-caproic acid, and of producing light stable yarns from such processed polyamide.

14. A process for the preparation of light stable, color-free polyamide yarns, comprising heating caprolactam monomer at temperature of 180–350° C. in the initial presence of at least 0.1% by weight of water with respect to the monomer, of between 0.001 and 0.01% by weight with respect to the monomer of a dibasic manganese salt of an acid selected from the group consisting of adipic and sebacic acid, and of one mol of the acetylamide of ε-aminocaproic acid to between 80 and 320 mols of caprolactam monomer, and producing yarns from said processed caprolactam.

References Cited in the file of this patent
UNITED STATES PATENTS

| | | |
|---|---|---|
| 2,130,523 | Carothers | Sept. 20, 1938 |
| 2,130,948 | Carothers | Sept. 20, 1938 |
| 2,277,152 | Schlack | Mar. 24, 1942 |
| 2,887,462 | Van Oot | May 19, 1959 |
| 2,984,647 | White | May 16, 1961 |

OTHER REFERENCES

Ser. No. 323,512, Hagedorn (A.P.C.), published Apr. 20, 1943 (abandoned).